United States Patent [19]

Koshiyouji et al.

[11] Patent Number: 4,893,196
[45] Date of Patent: Jan. 9, 1990

[54] IMAGE READING APPARATUS

[75] Inventors: Takashi Koshiyouji; Tsuyoshi Ishida, both of Yokohama, Japan

[73] Assignee: Kabushiki Kaisha Toshiba, Kawasaki, Japan

[21] Appl. No.: 178,615

[22] Filed: Apr. 7, 1988

[30] Foreign Application Priority Data

| Apr. 9, 1987 [JP] | Japan | 62-87488 |
| May 19, 1987 [JP] | Japan | 62-119993 |
| Jul. 22, 1987 [JP] | Japan | 62-182726 |

[51] Int. Cl.⁴ .................. H04N 1/04; H04N 1/10
[52] U.S. Cl. .................. 358/474; 358/491; 358/494; 358/497; 358/408
[58] Field of Search ........ 358/285, 293, 287, 286, 358/408, 474, 491, 494, 497

[56] References Cited

U.S. PATENT DOCUMENTS

| 4,486,786 | 12/1984 | Sato | 358/285 |
| 4,542,414 | 9/1985 | Nagane | 358/293 |
| 4,571,636 | 2/1986 | Itoh | 358/285 |
| 4,605,971 | 8/1986 | Kimura | 358/285 |
| 4,623,937 | 11/1986 | Watanabe | 358/285 |
| 4,673,989 | 6/1987 | Yamada | 358/287 |
| 4,682,242 | 7/1987 | Sugita | 358/293 |
| 4,684,998 | 8/1987 | Tanioka | 358/285 |
| 4,689,693 | 8/1987 | Watanabe | 358/293 |
| 4,731,667 | 3/1988 | Watanabe | 358/286 |
| 4,734,782 | 3/1988 | Maeshima | 358/293 |
| 4,743,974 | 5/1988 | Lockwood | 358/293 |
| 4,777,533 | 10/1988 | Watanabe | 358/286 |

FOREIGN PATENT DOCUMENTS

| 0054759 | 3/1986 | Japan. |
| 0246965 | 10/1988 | Japan. |
| 0252062 | 10/1988 | Japan. |
| 0252063 | 10/1988 | Japan. |
| 0286062 | 11/1988 | Japan. |
| 0000859 | 1/1989 | Japan. |

OTHER PUBLICATIONS

U.S. patent application Ser. No. 170,394 filed on Mar. 18, 1988.
U.S. patent application Ser. No. 50,012 filed May 15, 1987.

Primary Examiner—Edward L. Coles, Sr.
Assistant Examiner—Jerome Grant
Attorney, Agent, or Firm—Finnegan, Henderson, Farabow, Garrett and Dunner

[57] ABSTRACT

An image reading apparatus comprises an original table, a lamp located above the original table and used as a first light source for irradiating light to an original placed on the original table, another lamp located below the original table and used as a second light source for irradiating light to the original, and a photoelectric converter for receiving the light passing through the original or the light reflected therefrom, and converting the light into electric signals. Upon the pushing of a passing-light mode key incorporated in a console panel, the first light source is turned on and is moved, together with the photoelectric converter, in a straight line along the original table, in order to read the image formed on the original which is of the type through which light passes. Alternatively, when a reflected-light mode key is depressed, the second light source is turned on and is moved, together with the photoelectric converter in a straight line along the original table, in order to read the image formed on the original which is of the type from which light is reflected.

24 Claims, 7 Drawing Sheets

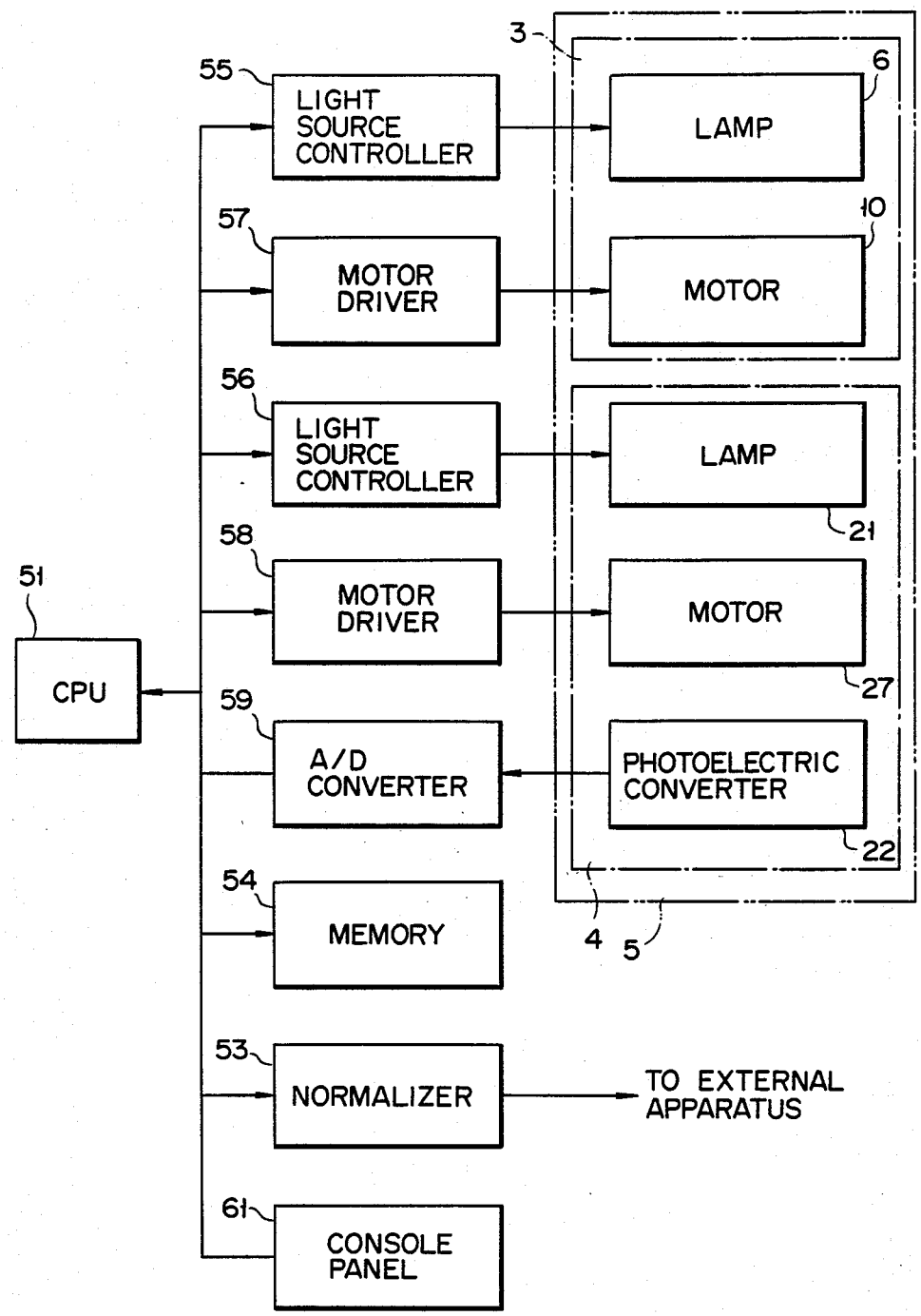
F I G. 4

IMAGE READING APPARATUS

BACKGROUND OF THE INVENTION

1. Field of the Invention

The present invention relates to an image reading apparatus which receives light reflected from, or passing through, an original, whereby it reads the image printed on the original and supplies image signals representing the image to an external apparatus such as a computer.

2. Description of the Related Art

As a result of the development, and now widespread availability, of personal computers able to process image data, a variety of image reading apparatuses has been developed, which are designed to input image data into such computers, and are now being used in increasing numbers. An example of such image reading apparatuses is that disclosed in U.S. Pat. No. 4,623,937, granted to J. Watanabe. This apparatus receives the light irradiated from a light source onto an original and reflected therefrom, and converts this reflected light into electric signals representing the image printed on the original. Also available is an image reading apparatus which receives and converts the light passing through an original into electric signals representing the image printed on the original.

Since, however, none of the conventional image reading apparatuses is able to read images by using either the light reflected from an original or else the light passing through it, i.e. they are confined to one or other of these modes, demand has therefore arisen for an image reading apparatus capable of operating in both the above-described modes.

When the original is a sheet of paper, the image printed thereon is normally read by way of the light reflected therefrom, while when it is a transparent film or sheet of OHP paper, the image thereon is read by way of the light passing through the original. While a positive image printed on a transparent film can also be read by way of the light reflected from the original, the image thus-obtained tends to have low resolution. This is because the light applied to the original cover (i.e., having a white surface) diffuses as it passes through the original cover, with the result that the image read on the basis of the light reflected from the film, in particular, fine detail, will inevitably be blurred. Thus, the positive image printed on a transparent film should ideally be read by way of the light passing through the film, as opposed to the light reflected therefrom.

As has been pointed out, no single conventional image reading apparatus can read an image by using either the light reflected from an original or else the light passing through it. Thus, two different image reading apparatuses must be used if it is required that images be read by way of light reflected from originals, as well as by light passing through originals.

SUMMARY OF THE INVENTION

Accordingly, it is the object of the present invention to provide an image reading apparatus which can read images by way of the light reflected from originals and also by way of the light passing through them.

According to this invention, there is provided an image reading apparatus for reading image data formed on an original, and which comprises: a transparent original table on which is placed an original from which an image is to be read; a first light source, located above the original table, for irradiating light to the original placed on the original table; a second light source, located below the original table, for irradiating light to the original placed on the original table; photoelectric converting means for receiving either the light irradiated by the first light source and passing through the original, or the light irradiated by the second light source and reflected from the original, converting the light into electric signals and outputting the electric signals as image data; first drive means, for moving the first light source along the original table; second drive means, for moving the second light source and the photoelectric converting means along the original table; original-specifying means for specifying whether the original is of a type through which light passes, or a type from which light is reflected; and control means for turning on the first light source and causing the first and second drive means to move the first light source and the photoelectric converting means along the original table when the original-specifying means specifies that the original is of the type through which light passes, and for turning oh the second light source and causing the second drive means to move the second light source and the photoelectric converting means along the original table when the original-specifying means specifies that the original is of the type from which light is reflected.

According to another aspect of this invention, there is provided an image reading apparatus for reading image data formed on an original, and which comprises: a transparent original table on which is placed an original from which an image is to be read; a first light source, located above the original table, for irradiating light to the original placed on the original table; a second light source, located below the original table, for irradiating light to the original placed on the original table; photoelectric converting means for receiving either the light irradiated by the first light source and passing through the original, or the light irradiated by the second light source and reflected from the original, converting the light into electric signals and outputting the electric signals as image data; first drive means, for moving the first light source and the photoelectric converting means simultaneously along the original table; second drive means, for moving the second light source and the photoelectric converting means simultaneously along the original table; original-specifying means for specifying whether the original is of a type through which light passes, or a type from which light is reflected; and control means for turning on the first light source and causing the first drive means to move the first light source and the photoelectric converting means along the original table when the original is of the type through which light passes, and for turning on the second light source and causing the second drive means to move the second light source and the photoelectric converting means along the original table when the original is of the type from which light is reflected.

According to a further aspect of this invention, there is provided an image reading apparatus for reading image data formed on an original, and which comprises: original-supporting means on which is placed an original from which an image is to be read; a light source for irradiating light to the original placed on the original-supporting means; photoelectric converting means for receiving the light passing through the original, converting the light into electric signals, and outputting the electric signals as image data; first drive means, for moving the light source along the original-supporting means; second drive means, for moving the photoelectric converting means along the original-supporting means; and means for causing the first and second drive means to move the light source and the photoelectric converting means simultaneously along the original-supporting means.

BRIEF DESCRIPTION OF THE DRAWINGS

FIG. 4 is a block diagram schematically illustrating the control system of the image reading apparatus shown in FIG. 1;

DETAILED DESCRIPTION OF THE PREFERRED EMBODIMENT

Figure 1:
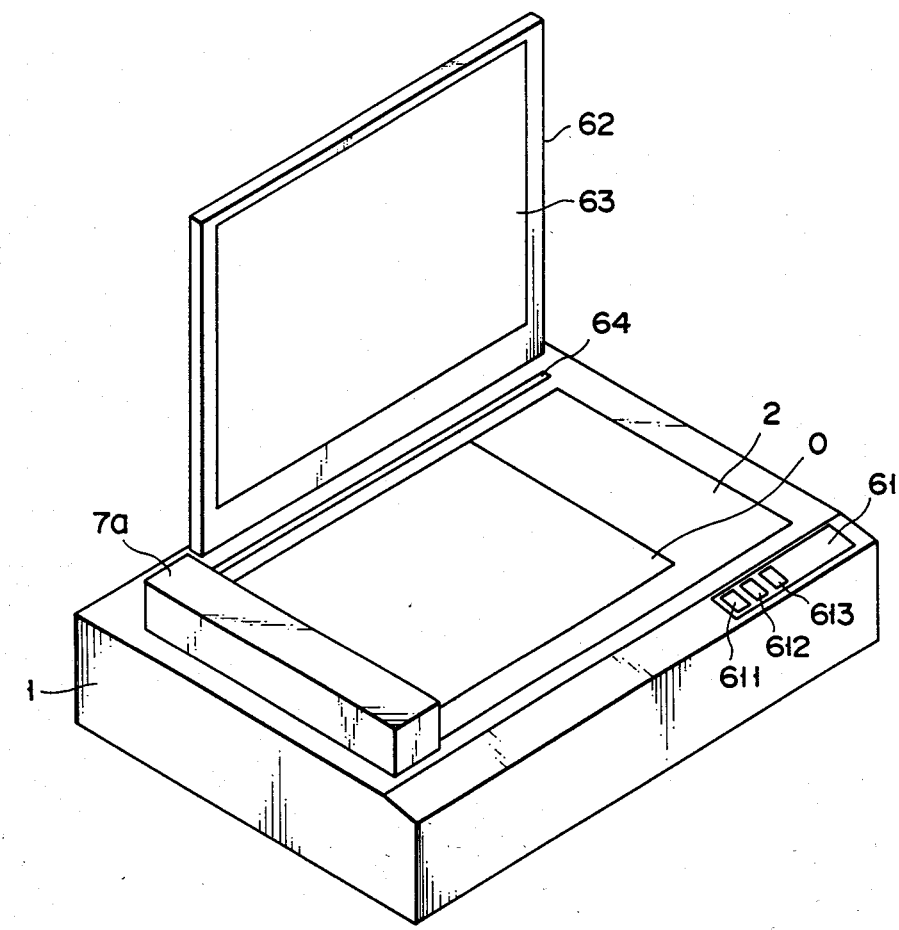
FIG. 1 is a perspective view of an image reading apparatus according to one embodiment of the present invention.
Figure 2:
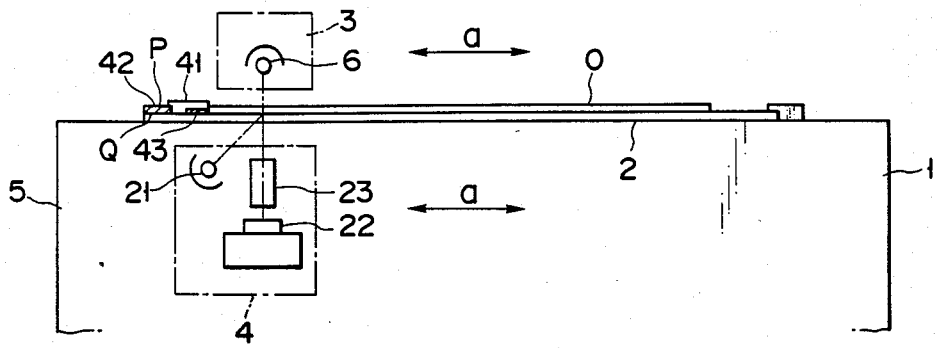
FIG. 2 is a side view schematically illustrating the internal structure of the image reading apparatus shown in FIG. 1.
Figure 3:
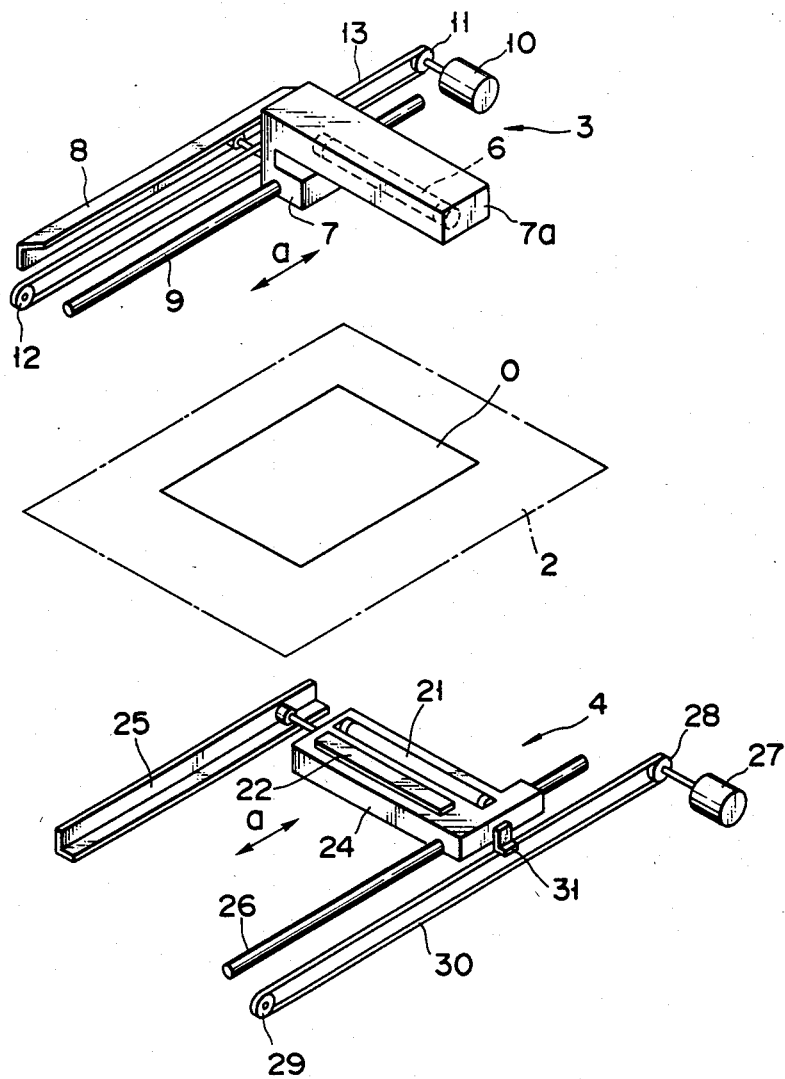
FIG. 3 is an exploded view showing the scanner-moving mechanism included in the original-scanning section of the apparatus shown in FIG. 1.

FIGS. 1 to 3 show an image scanner, i.e., an image reading apparatus according to the present invention. The image scanner is designed to read an image from the light reflected from a sheet of paper (i.e., an original), or from the light passing through a positive or negative film or through a sheet of OHP paper, and generates and supplies image signals representing the image, to an external apparatus such as a computer. As is shown in FIG. 1, the image scanner comprises box-shaped housing 1, original table 2 (i.e., platen glass) mounted on the upper surface of housing 1, and console panel 61 arranged on the inclined surface of housing 1. Original table 2 is a transparent glass plate.

As is illustrated in FIG. 2, the image scanner further comprises original-scanning section 5. Section 5 is composed of first scanner 3 and second scanner 4. First scanner 3 is located above original table 2, whereas second scanner 4 is provided within housing 1 and located below original table 2.

First scanner 3 can be moved back and forth along original table 2, in the direction of arrow a. As it is moved along original table 2, first scanner 3 optically scans an original O placed on original table 2. First scanner 3 comprises lamp 6 for illuminating the original 0, support member 7a supporting lamp 6, and carriage 7 (in FIG. 3) located within housing 1 and coupled to that portion of support member 7a which extends though slit 64 (in FIG. 1) cut in the upper surface of housing 1. Lamp 6 is, for example, a fluorescent lamp.

As is shown in FIG. 3, carriage 7 and support member 7a can move back and forth in the direction of arrow a, while being guided by guide rail 8 and guide bar 9. Motor 10, which can rotate in both forward direction and reverse direction, is located at one end of guide bar 9. Driving pulley 11 is connected to the shaft of this motor 10 (e.g., a stepper motor). Driven pulley 12 is located at the other end of guide gar 9. Timing belt 13 is wrapped around these pulleys 11 and 12. A fastener (not shown) fastens one portion of timing belt 13 to carriage 7. Hence, when motor 10 rotates in the forward direction or the reverse direction, carriage 7 is driven by timing belt 13, thus moving in a straight line.

As has been described, second scanner 4 is located below original table 2. It can move back and forth along the lower surface of table 2, in the direction of arrow a. As second scanner 4 moves in this way, it optically scans the original O set on original table 2. This scanner 4 comprises lamp 21 for illuminating the original O, photoelectric converter 22, optical system 23 for guiding the light reflected from, or passing through, the original O to photoelectric converter 22, and carriage 24 supporting lamp 21, converter 22, and optical system 23. Lamp 21 is, for example, a fluorescent lamp. Optical system 23 includes, for instance, a converging lens.

Photoelectric converter 22 converts the light reflected from the original O or the light passing therethrough, into electric signals representing the image printed on the original O. Photoelectric converter 22 includes, as a main component, a CCD-type line image sensor. As is illustrated in FIG. 3, carriage 24 can move back and forth in the direction of arrow a, while being guided by guide rail 25 and guide bar 26. Motor 27 (e.g., a stepper motor), which can rotate in both the forward direction and the reverse direction, is located at one end of guide bar 26. Driving pulley 28 is connected to the shaft of this motor 27. Driven pulley 29 is located at the other end of guide bar 26. Timing belt 30 is wound around these pulleys 28 and 29. Fastening member 31 fastens one portion of timing belt 30 to carriage 24. Hence, when motor 27 rotates in the forward direction or the reverse direction, carriage 24 is driven by timing belt 30, thus moving in a straight line.

As is illustrated in FIG. 2, scale 41, light-passing ruler 42, and light-reflecting ruler 43 are fixedly mounted on original table 2.

Light-passing ruler 42 is used to set a reference value of passing-light intensity. Since ruler 42 contacts a portion of the surface of original table 2 (hereinafter referred to as "optical focal surface Q"), no dust chances to be on optical focal surface Q. Dust, if any, on the upper surface P of light-passing ruler 42 does not influence the reference value of passing-light intensity at all. Light-passing ruler 42 is relatively thick, and prevents the original O from touching the optical focal surface Q in a reading area of the reference value. Therefore, a sufficiently accurate reference value of passing-light intensity can be set.

As is shown in FIG. 1, original cover 62 is fastened at one side to the upper surface of housing 1, by means of a hinge (not shown), such that it can be opened and closed. White light-reflecting plate 63 is bonded to the inner surface of original cover 62. Plate 63 can be replaced with a white light-reflecting sheet of paper. Thus, when original cover 62 is closed after the original O has been placed on original table 2, light-reflecting plate 63 contacts the original O, flattening the original O and taking the creases therefrom.

When the original O is a transparent film or a sheet of OHP paper, and first scanner 3 must be used to scan the original O, original cover 62 is opened as is illustrated in FIG. 1. Thus, first scanner 3 remains out of contact with original cover 62 end can move back and forth along the upper surface of original table 2.

FIG. 4 schematically shows the control system of the image scanner. The system comprises CPU 51, normalizer 53, memory 54, light source controllers 55 and 56, motor drivers 57 and 58, A/D converter 59, and console panel 61. CPU 51 is connected to normalizer 53, memory 54, controllers 55 and 56, drivers 67 and 58, A/D converter 59, and panel 61, so as to control these components.

As is shown in FIG. 1, console panel 61 has read-start key 611, reflected-light mode key 612, and passing-light mode key 613. When read-start key 611 is pushed, the image scanner starts reading an image from the original O. When key 612 is depressed, the image scanner is set in the reflected-light mode, whereby second scanner 4 can be operated. When key 613 is pushed, the image scanner is set in the passing-light mode, whereby first scanner 3 can be operated.

Normalizer 53 normalizes the digital image data converted from the light reflected from, or passing through, the original. That is, normalizer 53 corrects shading in the digital image data in accordance with the reference value of passing-light intensity or the reference value of reflected-light intensity, stored in memory 54. The reference value of passing-light intensity is represented by the digital data converted from the light which has passed through light-passing ruler 42. The reference value of reflected-light intensity is represented by the digital data converted from the light which has been reflected by light-reflecting ruler 43.

Light source controller 55 is connected to lamp 6. for turning lamp 6 on and off and controlling the amount of the light to be emitted from lamp 6. Similarly, light source controller 56 is coupled to lamp 21, for turning lamp 21 on and off and controlling the amount of the light to be emitted from this lamp 21. Motor driver 57 is coupled to motor 10, for driving this motor 10. Motor driver 58 is connected to motor 27, for driving motor 27. A/D converter 59 is connected to photoelectric converter 22, for converting the electric signals output by converter 22, into digital signals. These digital signals are supplied to CPU 51.

Figure 5:
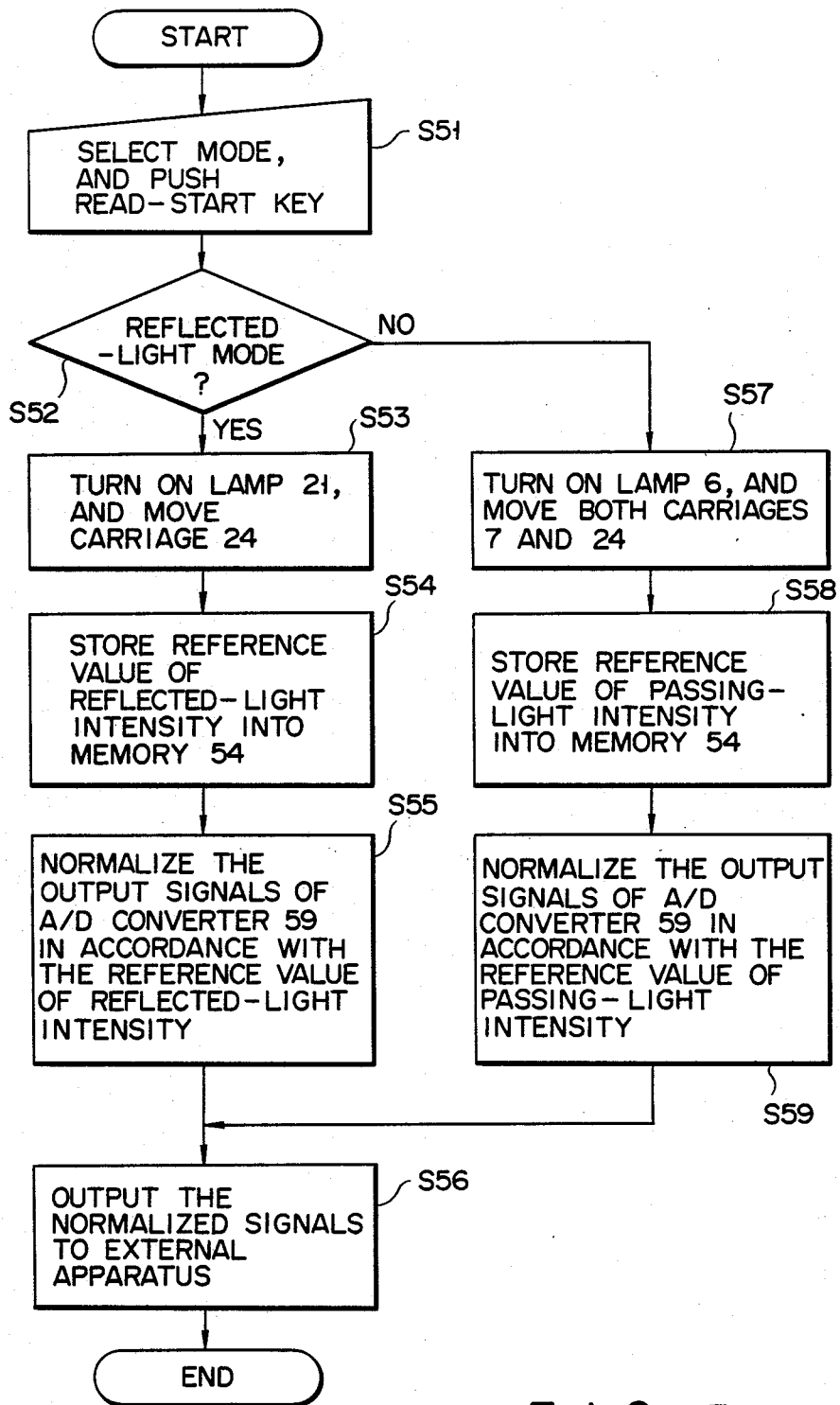
FIG. 5 is a flow chart explaining the operation of the image reading apparatus shown in FIG. 1.

The operation of the image scanner described above will now be explained, with reference to the flow chart of FIG. 5. First, an operator pushes key 612 or 613 of console panel 61, thus selecting either the reflected-light mode or the passing-light mode, then sets an original O on original table 2, and depresses read-start key 611 (Step S51). If the operator has pushed reflected-light mode key 612, he or she must close original cover 62 before pushing read-start key 611.

Then, CPU 51 determines which mode, the reflected-light mode or the passing-light mode, has been selected, in accordance with which mode key, key 162 or key 613, has been pushed (Step S52). If the reflected-light mode has been selected, CPU 51 causes light source controller 56 to turn on lamp 21,and also causes motor driver 58 to rotate motor 27, thus moving carriage 24 (Step S53). Lamp 21 applies light through original table 2 to light-reflecting ruler 43 and the original O. The light is reflected from ruler 43 and the original O (or light-reflecting plate 63), and is then guided to photoelectric converter 22 by means of optical system 23. Photoelectric converter 22 converts the light into electric signals. These signals are supplied to A/D converter 59. A/D converter 59 converts the electric signals, which are analog signals, into digital signals.

Of the digital signals generated by A/D converter 59, those obtained from the light reflected from light-reflecting ruler 43 are stored into memory 54, as the data representing the reference value of reflected-light intensity (Step S54). On the other hand, those digital signals, which have been produced from the light reflected from the original O, are input to normalizer 53. Normalizer 53 normalizes these digital signals in accordance with the reference-value data stored in memory 54 (Step S55). The digital signals, thus normalized, are output to an external apparatus (not shown), as the data representing the image read from the original O (Step S56).

If CPU 51 determines, in Step S52, that the passing-light mode has been selected, CPU 51 causes light source controller 55 to turn on lamp 6, causes motor drivers 57 and 58 to rotate both motors 10 and 27, thereby moving both carriages 7 and 24 (Step S57). As a result, lamp 6 and photoelectric converter 22 are simultaneously moved in the same direction. While lamp 6 is moving, it applies light to light-passing ruler 42 and the original O. The light passing through ruler 42 and the light passing through the original O are guided to photoelectric converter 22 by means of optical system 23. Converter 22 converts the input light into electric signals. The electric signals are supplied to A/D converter 59. A/D converter 59 converts these signals, which are analog signals, into digital signals.

Of the digital signals output by A/D converter 59, those produced from the light passing through light-passing ruler 42 are stored into memory 54, as the data representing the reference value of passing-light intensity (Step S58). On the other hand, those digital signals, which have been generated from the light passing through the original O, are input to normalizer 53. Normalizer 53 normalizes these signals in accordance with the reference-value data stored in memory 54 (Step S59). The digital signals, thus normalized, are output to toe external apparatus (not shown), as the data representing the image read from the original O (Step S56).

As has been described, the image scanner is able to read images from the light reflected from originals, and also from the light passing through originals.

Figure 6:
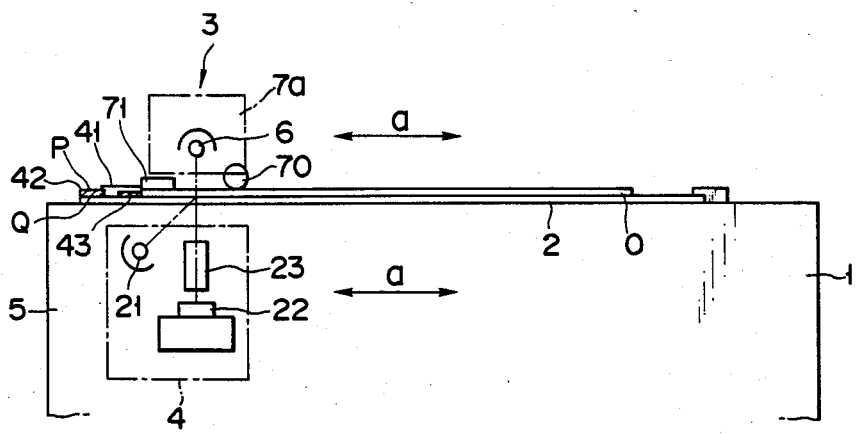
FIG. 6 is a side view schematically illustrating the internal structure of another embodiment of the present invention.
Figure 7:
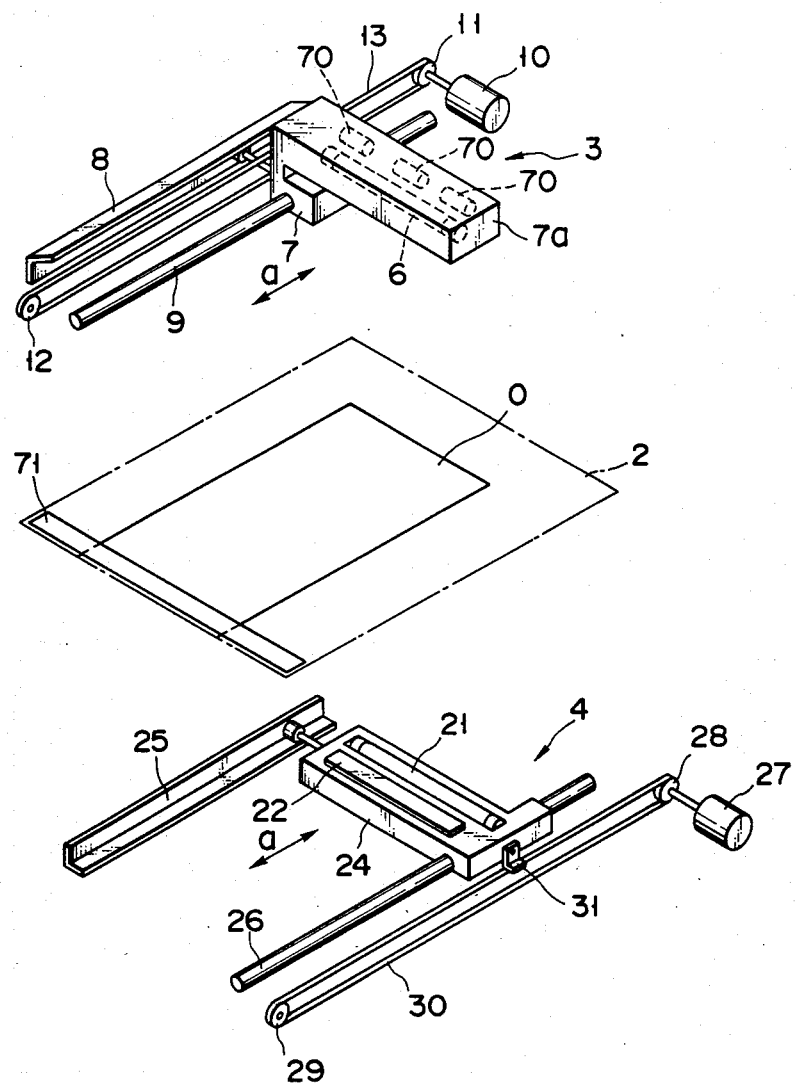
FIG. 7 is an exploded view showing the scanner-moving mechanism included in the original-scanning section of the image reading apparatus shown in FIG. 6.

The embodiment described above has no means for holding the original O through which light must pass to read the image printed on it. According to the present invention, such original-holding means can be used. For example, as is shown in FIGS. 6 and 7, rollers 70 are rotatably mounted on support member 7a, for holding an original O. These rollers 70 are so arranged as to rotate, in contact with the original O while straightening up the original O and taking creases therefrom, as first scanner 3 moves along the upper surface of original table 2. Original-clamping member 71 is provided on original table 2. The original O is positioned on table 2 and has its one edge clamped by member 71. Hence, the original O cannot move even while support member 7a is moving, and rollers 70 can straighten up the original and take creases out of the original. Thus, the original O is neither warped nor wrinkled, due to rollers 70, while first scanner 3 is applying light onto it. As has been described, when second scanner 4 is used to read an image from an original O, original cover 62 is closed, thus flattening the original O and taking creases out of the original. Therefore, the image can be correctly read from the light reflected from, or the light passing through, the original O.

Figure 9:
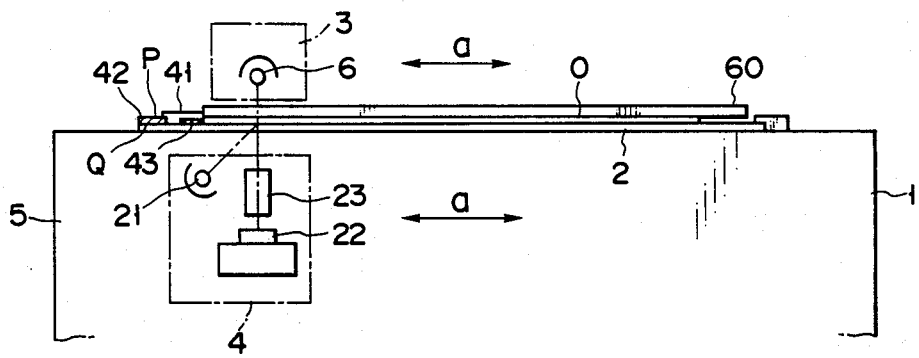
FIG. 9 is a side view schematically illustrating the internal structure of the image reading apparatus shown in FIG. 8.
Figure 8:
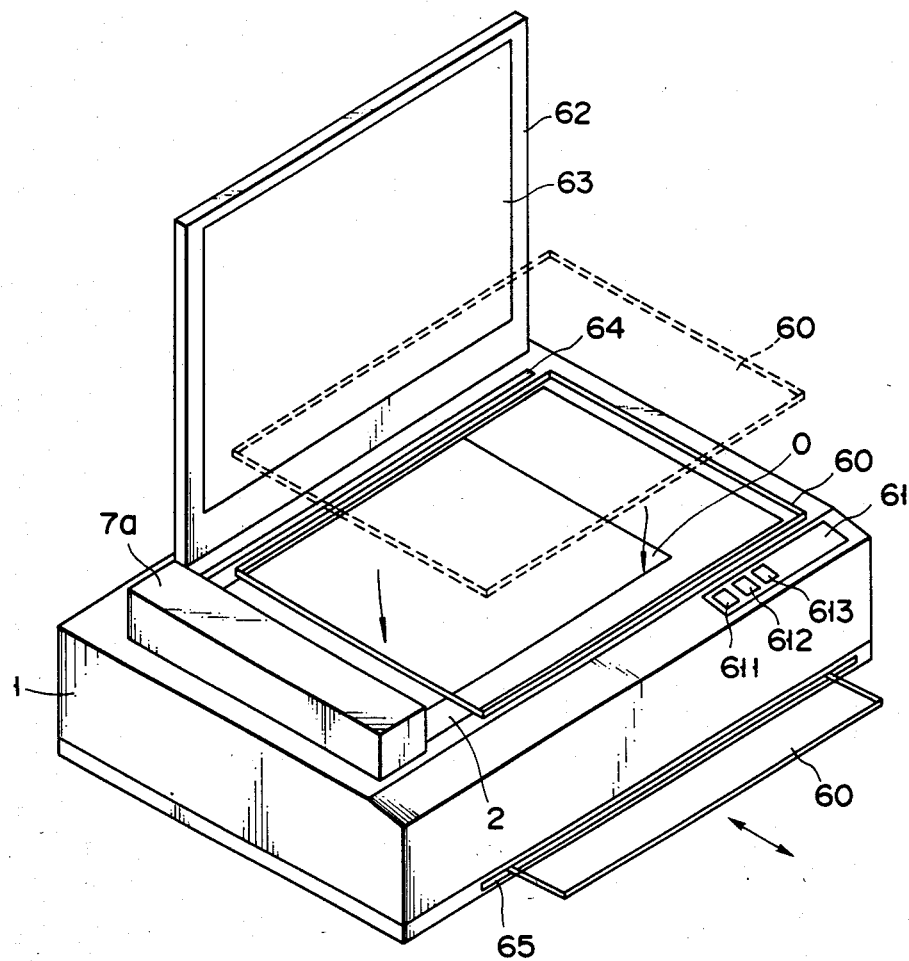
FIG. 8 is a perspective view showing yet another embodiment of this invention.

Further, as is illustrated in FIGS. 8 and 9, a transparent plate 60 can be used for covering an original 0 which is set on original table 2 and through which light must pass to read the image printed on it. Plate 60 is made of transparent material such as glass or an acrylic resin, and thus allows the passage of the light applied from lamp 6. When plate 60 is placed upon the original O, the original is straightened up and smoothened. When plate 60 is unnecessary, it can be stored into a storage space (not shown) within housing 1 through horizontal slit 65 cut in one side of housing 1. When plate 60 is used, it must be positioned not to cover up slit 64, so that supporting member 7a can move back and forth, guided by this slit 64. Thus, the original O is neither warped nor wrinkled, due to original cover 62, while it is being scanned by second scanner 4, and is smoothened by transparent plate 60 while it is being scanned by first scanner 3.

As has been described in detail, the image reading apparatus according to the present invention can read an image printed on an original, from the light reflected from the original and also from the light passing through the original, while keeping the original unwarped and unwrinkled.

The embodiment described above has two mode keys, one for selecting the reflected-light mode, and the other for selecting the passing-light mode. Needless to say, these keys can be replaced by a single mode key.

What is claimed is:

1. An image reading apparatus for reading image data from an original comprising:
    a transparent original table for supporting the original;
    a first light source, located on one side of said original table, for irradiating light to the original supported on said original table;
    a second light source, located on the opposite side of said original table, for irradiating light to the original supported on said original table;
    photoelectric converting means, located on said opposite side of said original table, for receiving the light irradiated by said first light source and passing through the original and the light irradiating by said second light source and reflected from the original, for converting the light into a plurality of electric signals, and for outputting the electric signals as image data;
    first drive means for moving said first light source along said original table;
    second drive means for moving said second light source and said photoelectric converting means along said original table;
    original-specifying means for specifying whether original is one of a light-passing type and a light-reflecting type; and
    control means for turning on said first light source and for causing said first and second drive means to move said first light source and said photoelectric converting means along said original table when said original-specifying means specifies that the original is of the light-passing type and for turning on said second light source, keeping said first light source turned off and causing said second drive means to move said first light source and said photoelectric converting means along said original table when said original-specifying means specifies that the original is of the light-reflecting type.

2. The image reading apparatus according to claim 1, wherein said second drive means moves said second light source and said photoelectric converting means simultaneously along said original table.

3. The image reading apparatus according to claim 2, wherein said second drive means includes a support member supporting said second light source and said photoelectric converting means and a drive mechanism for moving said support means along said original table.

4. The image reading apparatus according to claim 1, wherein said control means turns on said first light source and controls said first and second drive means such that said first light source and said photoelectric converting means are moved simultaneously along said original table when the original is of the light-passing type.

5. The image reading apparatus according to claim 1, further comprising:
    memory means for storing data representing a reference reflected-light intensity and data representing a reference passing-light intensity; and
    data-correcting means for correcting the image data output by said photoelectric converting means in accordance with one of the reference reflected-light intensity data and the reference passing-light intensity data stored in said memory means.

6. The image reading apparatus according to claim 5, wherein said data-correcting means corrects the image data output by said photoelectric converting means in accordance with the reference passing-light intensity data when the original placed on said original table is of the light-passing type, and when the original is of the light-reflecting type, corrects the image data output by said photoelectric converting means in accordance with the reference reflected-light intensity data.

7. The image reading apparatus according to claim 5, further comprising:
    a light-passing plate mounted on said original table;
    a light-reflecting plate mounted on said original table; and
    memory control means for storing is said memory means, image data corresponding to the electric signals converted by said photoelectric converting means from the light passing through said light-passing plate, when said original-specifying means specifies that the original supported on said original table is of the light-passing type, and for storing in said memory means image data corresponding to the electric signals converted from the light reflected from said light-reflecting plate by said photoelectric converting means when said original-specifying means specifies that the original is of the light-reflecting type.

8. The image reading apparatus according to claim 7, wherein original table comprises a peripheral portion and said light-passing plate and said light-reflecting plate are located on said peripheral portion such that said photoelectric converting means, when moving from an initial position, receives the light passing through said light-passing plate before receiving the light passing through the original supported on said original table, and receives the light reflected from said light-reflecting plate before receiving the light reflected from the original.

9. The image reading apparatus according to claim 7, wherein said light-passing plate is thick.

10. The image reading apparatus according to claim 1, further comprising original-smoothing means mounted on said first drive means, for smoothing the original placed on said original table as said first drive means moves along said original table.

11. The image reading apparatus according to claim 10, further comprising original-holding means for holding at least one edge of the original placed on said original table.

12. The image reading apparatus according to claim 1, further comprising:
   a white plate for holding and smoothing the original placed on said original table when the original is of the light-reflecting type
   a transparent plate for holding and smoothing the original placed on said original table when the original is of the light-passing type.

13. The image reading apparatus according to claim 12, wherein said first drive means moves said first light source along said transparent plate while the original is being held and smoothed by said transparent plate.

14. The image reading apparatus according to claim 12, wherein said white plate is capable of covering said original table when the original is of the type from which light is reflected, and capable of uncovering said original table when the original is of the light-passing type; and said transparent plate is mounted on the original placed on said original table when the original is of the light-passing type.

15. An image reading apparatus for reading image data from an original comprising:
   a transparent original table for supporting the original;
   a first light source, located on one side of said original table, for irradiating light to the original supported on said original table;
   a second light source located on the opposite side of said original table, for irradiating light to the original supported on said original table;
   photoelectric converting means for receiving the light irradiated by said first light source and passing through the original and the light irradiated by said second light source and reflected from the original, for converting the light into a plurality of electric signals, and for outputting the electric signals as image data;
   first drive means for moving said first light source and said photoelectric converting means simultaneously along said original table;
   second drive means for moving said second light source and said photoelectric converting means simultaneously along said original table;
   original-specifying means for specifying whether the original is one of a light-passing type and a light-reflecting type; and
   control means for turning on said first light source, for keeping the second light source turned off, and for causing said first drive means to move said first light source and said photoelectric converting means simultaneously along said original table when the original is of the light-passing type and for turning on said second light source, for keeping the first light-source turned off, and for causing said second drive means to move said second light source and said photoelectric converting means simultaneously along said original table when the original is of the light-reflecting type.

16. The image reading apparatus according to claim 15, wherein said first drive means includes a first drive mechanism for moving said first light source and a second drive mechanism for moving said photoelectric converting means; and said second drive means includes said second drive mechanism, and a support member supporting said second light source and said photoelectric converting means, said second drive mechanism being adapted to move said support member.

17. The image reading apparatus according to claim 15, further comprising original-smoothing means mounted on said first drive means for smoothing the original placed on said original table as said first drive means moves along said original table.

18. The image reading apparatus according to claim 17, further comprising original-holding means for holding at least one edge of the original placed on said original table.

19. The image reading apparatus according to claim 15, further comprising:
   a white plate for holding and smoothing the original supported on said original table when the original is of the light-reflecting type; and
   a transparent plate for holding and smoothing the original supported on said original table when the original is of the light-passing type.

20. An image reading apparatus for reading image data from an original comprising:
   original-supporting means for supporting the original;
   a light source for irradiating light to the original supported on said original-supporting means;
   photoelectric converting means for receiving the light passing through the original, converting the light into a plurality of electric signals, and outputting the electric signals as image data;
   first drive means for moving said light source along said original-supporting means;
   second drive means for moving said photoelectric converting means along said original-supporting means; and
   means for causing said first and second drive means to move said light source and said photoelectric converting means simultaneously along said original-supporting means.

21. The apparatus according to claim 1, further comprising:
   means for flattening the original on the original table when the original is of the light-reflecting type; and
   means for shifting said weighting means when the original is of the light-passing type.

22. The apparatus according to claim 1, in which said first light source and said second light source each comprise a linear light source arranged across the direction of movement of said photoelectric converting means and said photoelectric converting means comprises a linear array including a plurality of photoelectric converting elements arranged parallel to the linear light source.

23. The apparatus according to claim 15, further comprising:
   means for flattening the original on the original table when the original is of the light-reflecting type; and
   means for shifting said weighting means when the original is of the light-passing type.

24. The apparatus according to claim 15, in which said first light source and said second light source each comprise a linear light source arranged across the direction of movement of said photoelectric converting means and said photoelectric converting means comprises a linear array including a plurality of photoelectric converting elements arranged parallel to the linear light source.

* * * * *

UNITED STATES PATENT AND TRADEMARK OFFICE
CERTIFICATE OF CORRECTION

PATENT NO. : 4,893,196
DATED : January 09, 1990
INVENTOR(S) : Takashi KOSHIYOUJI It is certified that error appears in the above-identified patent and that said Letters Patent is hereby corrected as shown below:

Claim 1, Column 7, Line 46, change "irradiating" to --irradiated--;

Claim 7, Column 8, Line 43, change "is" to --in--.

Signed and Sealed this

Sixteenth Day of June, 1992

Attest:

DOUGLAS B. COMER

*Attesting Officer*  *Acting Commissioner of Patents and Trademarks*